(12) United States Patent
Jönsson

(10) Patent No.: US 7,098,630 B2
(45) Date of Patent: Aug. 29, 2006

(54) CONTROL MEANS AND METHODS FOR A TRANSISTOR SWITCH CIRCUIT

(76) Inventor: Ragnar Jönsson, Kyrkobacksvägen 5, SE-271 96 Ystad (SE)

( * ) Notice: Subject to any disclaimer, the term of this patent is extended or adjusted under 35 U.S.C. 154(b) by 0 days.

(21) Appl. No.: 10/472,338

(22) PCT Filed: Mar. 28, 2002

(86) PCT No.: PCT/SE02/00624

§ 371 (c)(1),
(2), (4) Date: Jan. 14, 2004

(87) PCT Pub. No.: WO02/080343

PCT Pub. Date: Oct. 10, 2002

(65) Prior Publication Data

US 2004/0130360 A1    Jul. 8, 2004

(30) Foreign Application Priority Data

Mar. 30, 2001   (SE) ................... 0101125

(51) Int. Cl.
*G05F 1/10* (2006.01)
(52) U.S. Cl. .............. 323/222; 323/223; 323/224; 323/286; 323/289; 323/290
(58) Field of Classification Search ........... 327/108, 327/109, 110, 112; 363/17
See application file for complete search history.

(56) References Cited

U.S. PATENT DOCUMENTS

| | | | | |
|---|---|---|---|---|
| 3,065,347 A | | 11/1962 | Bossart ................. 250/351 |
| 3,579,279 A | * | 5/1971 | Inaba et al. ............ 318/696 |
| 4,316,230 A | * | 2/1982 | Hansen et al. .......... 361/114 |
| 4,933,630 A | * | 6/1990 | Dupraz ................... 324/107 |
| 4,947,309 A | * | 8/1990 | Jonsson ................... 363/17 |
| 5,519,306 A | * | 5/1996 | Itoh et al. ............... 323/222 |
| 5,539,354 A | * | 7/1996 | Carsten .................. 327/559 |
| 5,572,416 A | * | 11/1996 | Jacobs et al. ............ 363/89 |
| 5,712,536 A | * | 1/1998 | Haas et al. .............. 315/247 |
| 5,808,879 A | * | 9/1998 | Liu et al. ................ 363/17 |
| 6,188,206 B1 | * | 2/2001 | Nguyen et al. .......... 323/222 |
| 6,229,288 B1 | * | 5/2001 | Baretich et al. ......... 323/223 |
| 6,272,027 B1 | * | 8/2001 | Fraidlin et al. .......... 363/26 |
| 6,452,365 B1 | * | 9/2002 | Majumdar et al. ....... 323/223 |
| 6,498,463 B1 | * | 12/2002 | Chang .................... 323/222 |
| 6,614,218 B1 | * | 9/2003 | Ray ........................ 324/117 R |

OTHER PUBLICATIONS

Millman and Halkias; Integrated Electronics Analog and Digital Circuits and Systems; McGraw-Hill; 1972.*

Handbook of Opreational Amplifier Circuit Design; David F. Stout and Milton Kaufman; McGraw-Hill; 1972.*

(Continued)

*Primary Examiner*—Tuan T. Lam
*Assistant Examiner*—Hiep Nguyen
(74) *Attorney, Agent, or Firm*—Ladas & Parry LLP

(57) ABSTRACT

The invention relates to a control means and method for a transistor switch circuit controlling a power supply circuit for providing electric power to a load, comprising: a power supply stage having an LC circuit with an inductor, and a control stage having an estimation of the inductor current as a feedback signal. According to the invention, the current through the inductor is measured by means of a measuring winding (17) and an integrator having the function of an RC network. The current measuring circuit is very stable and absolutely free from any source of offset signals. Also, it has no frequency limitations.

6 Claims, 7 Drawing Sheets

OTHER PUBLICATIONS

Paul Horowitz, Winfield Hill; The Art of Electronics; Cambridge University Press; Jan. 1, 1980; pp. 22-23.*

Millman and Halkias; Integrated Electronics; McGraw-Hill; 1972; pp. 543-545.*

* cited by examiner

CONTROL MEANS AND METHODS FOR A TRANSISTOR SWITCH CIRCUIT

BACKGROUND OF THE INVENTION

1. Field of Invention

This invention relates to a special type of switch circuit for power electronics, intended to supply electric power to any type of load. The load may be an electric motor, an electric lamp, an electric loudspeaker or any other type of system that needs a controlled supply of voltage and current. The power level can be from less than a watt to hundreds of kilowatts. The direction of power flow can also be regenerative, i.e. from the load to the power supply. The major purpose of the special switch circuit is to supply controllable electric power with low electric losses in the switch circuit and with low electric noise at the input and output of the switch circuit.

A current comparator compares the measured inductor current with a pre-set reference value of inductor current and reacts when the measured current exceeds the pre-set value.

It is not easy to measure the inductor current in a simple, accurate and economical way. The present invention discloses a method and means to measure the current by means of a measuring winding in the inductor and a very simple integrator circuit.

2. Prior Art

The U.S. Pat. No. 4,947,309 "Method and Means for Controlling a Bridge Circuit" describes a special switch circuit. In the following, "switch circuit" refers to this special switch circuit. It is a classical bridge circuit, consisting of two transistor switches and two free-wheel diodes connected in series between a positive and a negative power bus. The bridge circuit is combined with an LC filter at the output of the transistor bridge plus a control circuit with a special switch sequence for controlling the bridge circuit. The primary purpose of the LC filter is to isolate the bridge current from the load current in such a way that the bridge current can go to zero during each switching cycle, while the load current is constant or approximately constant. Such a load current is typical for all applications with inductive load, for example an electric motor. Thanks to the LC filter and the special switch sequence it is possible to turn on the upper or lower transistor at zero transistor current and essentially zero transistor voltage. This eliminates the high electric stress and the electric losses that occur during turn on of conventional bridge circuits. A secondary purpose of the LC filter is to isolate the switching transients in the bridge circuit from the output of the switch circuit. Thanks to this it is possible to control high electric power with low electric noise at the output of the switch circuit.

The switch circuit is suitable for use in so called "frequency inverters" for control of electric AC motors. Then one switch circuit is needed for every motor phase. Only one switch circuit is described in the following.

The control system for the switch circuit requires a feedback signal representing the inductor current. In the prior art a circuit with operational amplifiers has been used for estimation of the inductor current. The present invention provides a simplified measuring circuit for integrating an induced voltage in a measuring winding on the inductor to obtain a representation of the inductor current. This solution is much simpler, costs much less and is more reliable and accurate. The current measuring circuit is very stable and absolutely free from any source of offset signals. Also, it has no upper frequency limitations.

SUMMARY OF THE INVENTION

The present invention provides means for controlling a power supply circuit for providing electric power to a load, comprising: a power supply stage with a transistor bridge and an LC circuit with an inductor and filter capacitors, and a control stage having an estimation of the inductor current as a feedback signal.

According to the invention, a means for measuring the current through the inductor comprises a measuring winding on the inductor and an integrator consisting of an RC network.

Preferably, the power supply stage comprises an LC circuit with an inductor and filter capacitors and a bridge circuit including two semiconductor members connected in series between positive and negative power supply rails, each semiconductor member comprising a switchable member for conducting current to or from the load in the forward direction of the semiconductor member under control of a control drive circuit, and a free-wheel diode for conducting current in the opposite direction.

The control stage comprises a monitor circuit for monitoring the bridge voltage of the connection between the two semiconductor members and the current through the inductor, said monitor circuit comprising a first comparator for comparing when the current through the inductor exceeds a reference value and a second comparator for comparing when the bridge voltage changes polarity towards the corresponding rail polarity; and a drive circuit adapted to provide a firing pulse to one of said switchable members of said semiconductor members for initiating the conduction thereof; said control drive circuit being adapted to terminate the conduction of said switchable member when said first comparator determines that the current through the inductor exceeds said reference value, and to provide another firing pulse when said second comparator determines that the bridge voltage changes polarity towards the corresponding rail polarity.

The present invention also provides a method for controlling a power supply circuit of the above type. According to the invention, the current through the inductor is measured by means of a measuring winding and an integrator consisting of an RC network.

BRIEF DESCRIPTION OF THE DRAWINGS

The invention is described in further detail below by means of a preferred embodiment of the invention and with reference to the appended drawings.

FIGS. 3-b and 3-c show time diagrams appearing in the integrator of FIG. 3-a.

FIG. 4-b shows a time diagram of the signals appearing in the integrator of FIG. 4-a.

FIG. 4-c shows a simplified measuring circuit according to the present invention.

DETAILED DESCRIPTION OF THE PREFERRED EMBODIMENTS

Figure 1:
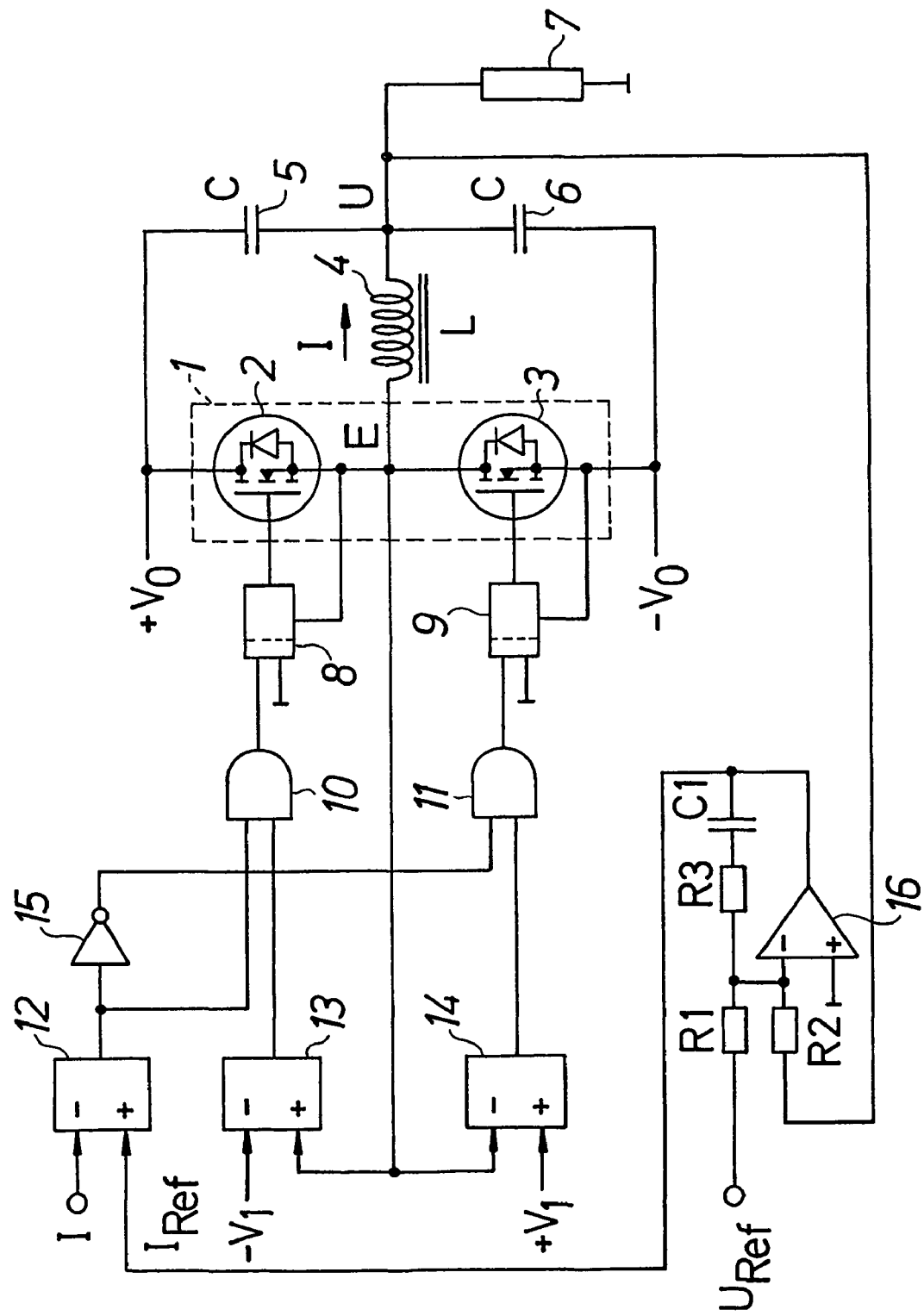
FIG. 1 is circuit diagram of the switch circuit according to prior art.

FIG. 1 shows a circuit diagram of the switch circuit according to prior art. A bridge circuit 1 is created by two switch transistors 2, 3 connected in series between a plus bus +Vo and a minus bus −Vo. The two transistors in the diagram are of MOSFET type with free-wheel diodes integrated in the transistor structure. The diodes are shown inside the transistor symbols. If IGBT (Insulated Gate Bipolar Transistor) transistors are used instead of MOSFET transistors, separate free-wheel diodes must be connected in parallel with the transistors.

FIG. 1 shows a circuit with a positive and a negative supply voltage Vo, symmetrically centered around zero or ground level. Other configurations are possible.

The connection point between the two transistors is defined as the output of the transistor bridge 1, and an inductor 4 with the inductance value L is connected to this output. The other end of the inductor is connected to two filter capacitors 5 and 6, each with the capacitance value C, and this connection point is also the output to the load 7. For symmetry reasons the two filter capacitors are connected to the plus and minus bus, respectively. The LC circuit serves to isolate the transistor bridge from the load, and makes it possible to have a relatively constant current in the load while at the same time the inductor current changes between zero and maximum during each switch cycle.

This part of the circuit diagram represents the "power section", which handles large voltages and currents. The voltage from the bridge circuit is E and the output voltage to the load is U. The inductor current is I.

Drive circuits 8 and 9 that must be electrically isolated from each other are connected to the switch transistors. The drive circuits are controlled by signals from the AND gates 10 and 11. Some kind of electric isolation between the drive circuits 8 and 9 and the AND gates 10 and 11 is necessary, as is well-known.

The switch circuit is controlled in a special "switch sequence" which is created by the logic control elements 10–15. First a positive switch sequence is described.

A complete switch cycle for positive output current starts with turn on of the upper switch transistor. The inductor current starts from zero and increases linearly in positive direction. At a controlled current level the transistor is turned off and the inductor current begins to decrease towards zero. Zero current is automatically detected and a new switch cycle can start. An equivalent switch cycle is used for negative output current.

A characteristic feature of the switch circuit is that turn on and turn off of the switch transistors are controlled by separate functions. Turn on is controlled by a voltage comparator. Turn off is controlled by a current comparator.

Two voltage comparators 13, 14 measure the voltage E from the output of the bridge circuit and compare it with two offset voltages −V1 and +V1. The output from comparator 13 goes high when the voltage E is higher than the offset −V1 and the output from comparator 14 goes high when the voltage E is lower than the offset voltage +V1. The outputs from the voltage comparators help to control the switch transistors and a high output permits that the switch transistors can be turned on. The two offset voltages −V1 and +V1 create a "window" around zero level, and when the bridge voltage E is inside this window both voltage comparators give a high output. The purpose of this window is only to facilitate the start of the switch circuit, and it has nothing to do with the switch sequence during normal operation.

A current comparator 12 compares a measured (or estimated) value I from the inductor 4 with a reference current value Iref. Iref is obtained by means of a voltage control circuit comparing the output voltage U at the load with a reference voltage value Uref which in turn is received from an external control device (not shown). Uref represents the desired load voltage and Iref represents the desired load current. The output from the comparator 12 is high as long as the measured value I is lower than the reference value Iref. A high value from the comparator output permits that the upper switch transistor 2 can be turned on.

The logic AND gate 10 combines the signals from voltage comparator 13 and current comparator 12 and controls the upper switch transistor 2. A high output from the AND gate 10 turns on the transistor.

Figure 2:
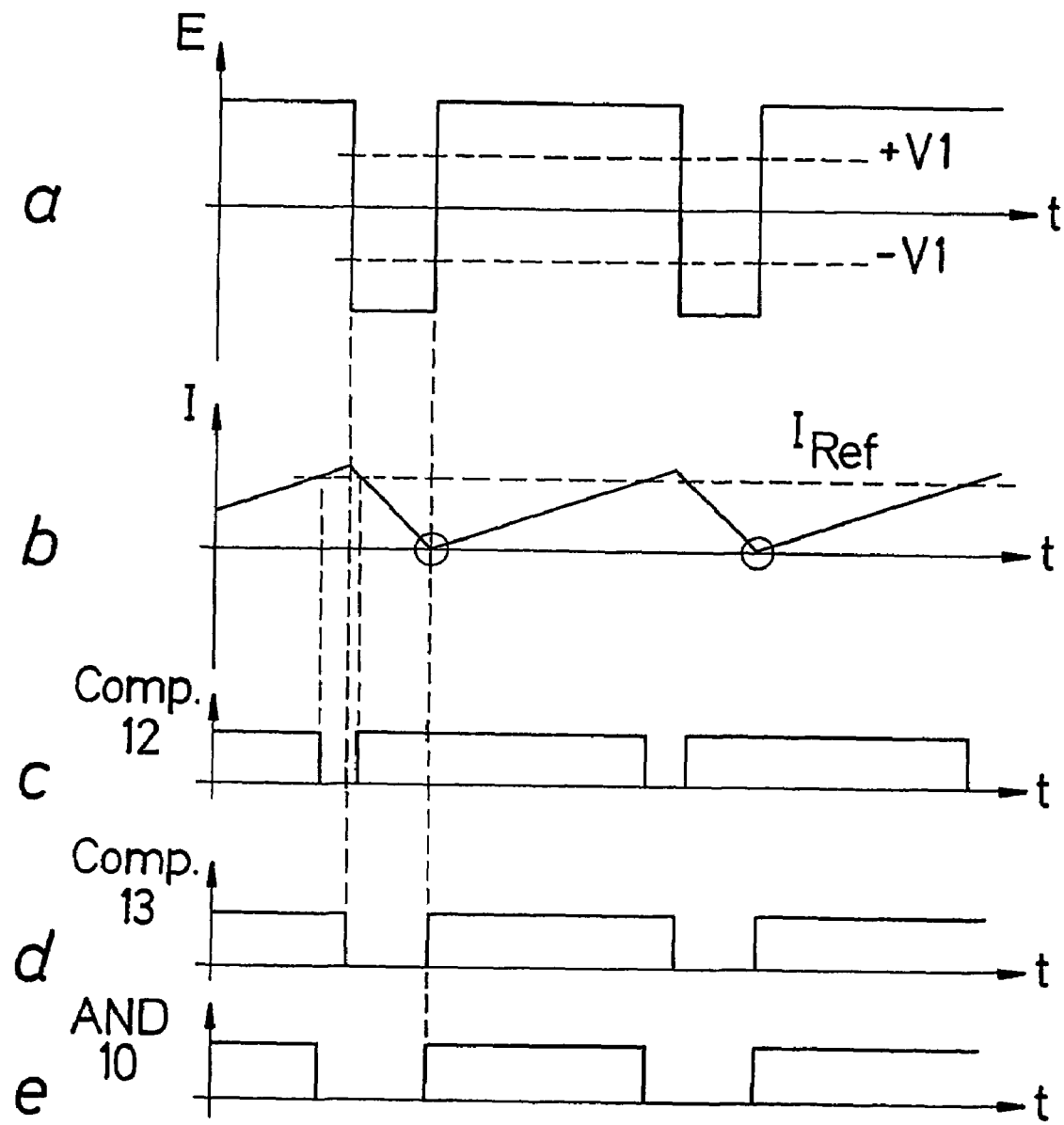
FIG. 2 is a time diagram of various signals appearing in the circuit of FIG. 1.

A complete switch sequence with positive output current will be described. The shape of the respective signals are shown in FIG. 2. The upper switch transistor 2 is turned on when both inputs to AND gate 10 are high. The bridge voltage E goes high. The current I through inductor 4 starts from zero and rises until it reaches the reference value Iref. In this moment the output from current comparator 12 goes low and this turns off the upper switch transistor 2 via AND gate 10. FIG. 2 shows a short time delay between the comparator signal and the transistor turn-off, caused by inherent delays in the drive circuit. The inductor current I cannot be turned off abruptly and finds a new way through the lower free-wheel diode in switch transistor 3. This forces the bridge voltage E to go low and the inductor current I starts to decrease. The output from current comparator 12 goes high as soon as the inductor current is below the reference value Iref, but now the output from voltage comparator 13 is low, and consequently AND gate 10 keeps the upper switch transistor 2 turned off.

The voltage across inductor 4 is now negative and this causes the inductor current to decrease until it is exactly zero. But the process doesn't stop there. The free-wheel diode inside the lower switch transistor 3 is still open and there is still a negative voltage across the inductor. This voltage starts to build up a negative inductor current (not shown in FIG. 2). This current flows through the lower free-wheel diode in "backward" direction and this is called a "reverse recovery current". Very soon the diode has received a "reverse recovery charge" and this turns off the diode. Again there is an inductor current which cannot be turned off abruptly. The current finds a new way through the free-wheel diode in the upper transistor 2. This forces the bridge voltage E to rise quickly, until it is clamped to the plus bus by the upper free-wheel diode. Then the inductor current begins to flow through the upper free-wheel diode to the plus bus. The "automatic" switch function created by the lower free-wheel diode takes place within the circled areas of FIG. 2b.

The quick voltage rise of the bridge voltage E is detected by voltage comparator 13 and now the logic signals are such that the logic AND gate 10 can turn on the upper switch transistor 2 for a new cycle.

It should be observed that only the upper switch transistor 2 is turned on during the complete switch cycle. A similar switch cycle can be generated via turn on of the lower switch transistor 3, this time resulting in a negative output current through the inductor 4. The only differences in the control logic are that the logic gate 15 reverses the output signal from current comparator 12, before it is connected to the logic AND gate 11, and the comparators 13 and 14 have different polarities.

The reference value Iref for inductor current determines if the upper or the lower switch transistor shall be turned on. The reference value can be generated from an external source.

Normally the switch circuit is combined with a feedback loop for voltage control. The output voltage U from the power stage of the switch circuit is fed back to a control amplifier 16 with the input resistors R1 and R2, a feedback resistor R3 and a feedback capacitor C1. The output voltage is compared with a reference voltage value Uref received from an external control device (not shown). The control amplifier 16 amplifies the difference voltage and the output signal is used as reference value Iref for the inductor current. The control amplifier 16 can be proportional and integrating (PI-type) as shown in the figure, but other solutions are possible. Also digital solutions in hardware or software are possible.

The output signal from the voltage control amplifier 16 (Iref) can also be used as a measure of the actual load current, which may be required by the external control device, e.g. a motor control system. This saves the cost of a separate current sensor. This is an important feature in low-cost motor control systems.

FIG. 2 shows a time diagram of a complete switch cycle with positive output current according to the description above. A typical fall time and rise time for the bridge voltage E is well below one microsecond, while a complete switch cycle can be 50 microseconds, typically.

Curve a shows the bridge voltage E with indication of the two comparator voltages +V1 and −V1. Curve b shows the measured inductor current I with indication of a positive reference current Iref. Curve c shows the output signal from current comparator 12. Curve d shows the output signal from voltage comparator 13. Curve e shows the output signal from AND gate 10. A similar set of curves can be drawn for a switch cycle with negative output current.

FIGS. 1 and 2 have described the switch circuit according to prior art.

A comparator 12 for the inductor current I and the reference current Iref controls the switch circuit. The original invention of the switch circuit shows how the inductor current can be calculated as the mathematical integral of the voltage (E−U) across the inductor 4. However, it is expensive to create this signal and the voltage should be compensated for the resistive voltage drop in the inductor winding.

The present invention discloses an improved means and method for measurement of the inductor current. A measuring winding 17 on the inductor 4 measures the true induced voltage. If this voltage is integrated it will give a true measure of the inductor current. The measuring winding can be made very simple, as one turn of wire around the inductor core.

Figure 3:
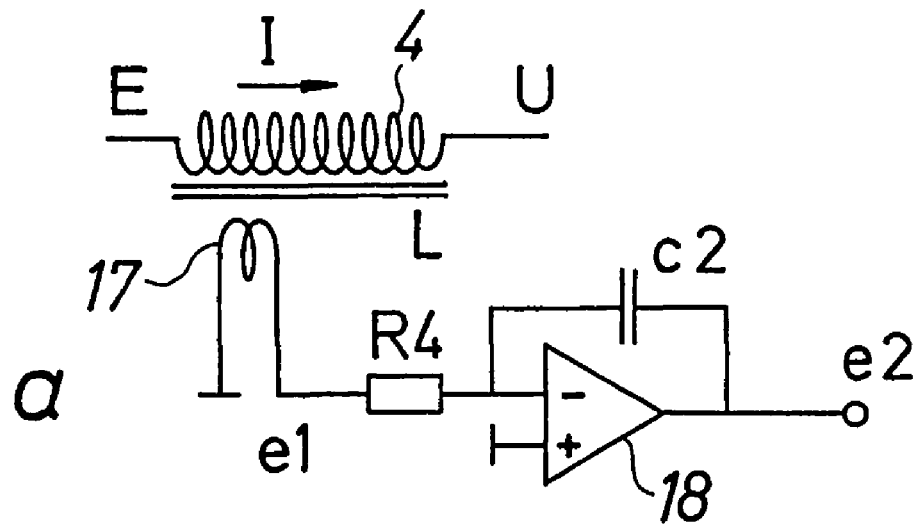
FIG. 3-a shows a measuring winding with a conventional analog integrator.
Figure 3:
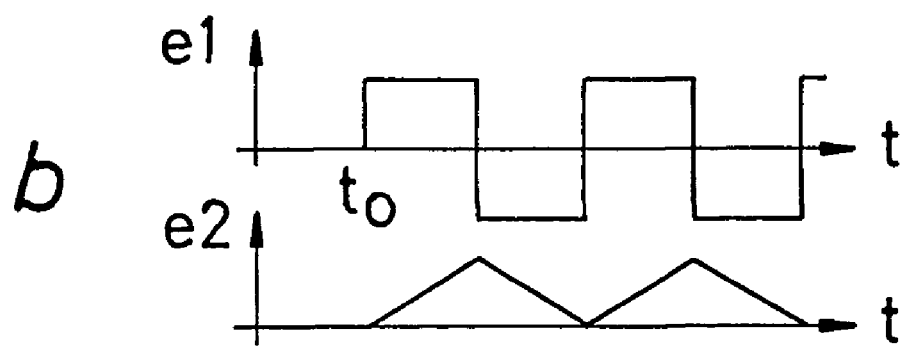
Figure 3:
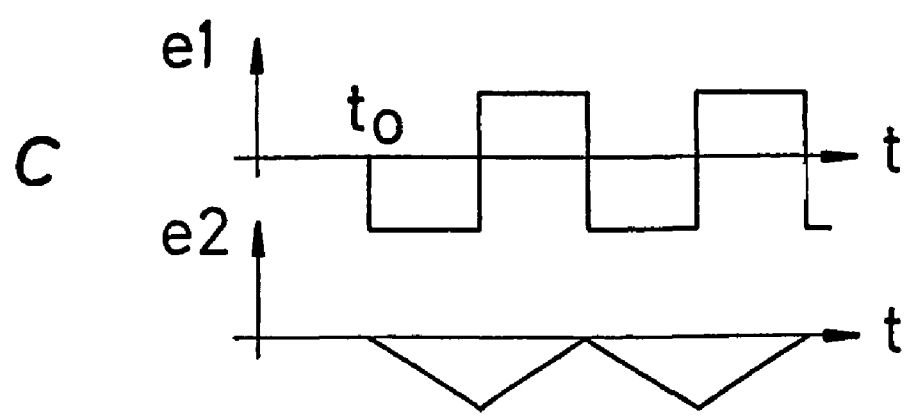

FIG. 3-a shows a conventional analog integrator consisting of an operational amplifier 18 with a feedback capacitor C2 and an input resistor R4. The measuring winding 17 with the induced voltage e1 is connected to the integrator. The integrated voltage signal represents the inductor current and is shown as a voltage e2 at the integrator output.

FIG. 3-b shows a time diagram for a symmetrical switch sequence that starts at time $t_0$ in positive direction. The integrated signal represents the true inductor current.

FIG. 3-c shows a similar time diagram but this time the switch sequence starts at time $t_0$ in negative direction. Again the integrated signal represents the true inductor current.

The current in FIG. 3-b is always positive and the current in FIG. 3-c is always negative. This is correct and it depends on the initial or starting conditions. It is well known that the starting conditions are important when integrals are calculated.

Unfortunately, it is impossible to use a pure integrator as shown in FIG. 3-a. Any offset will drive the integrator in positive or negative direction towards saturation (an end stop).

Figure 4:
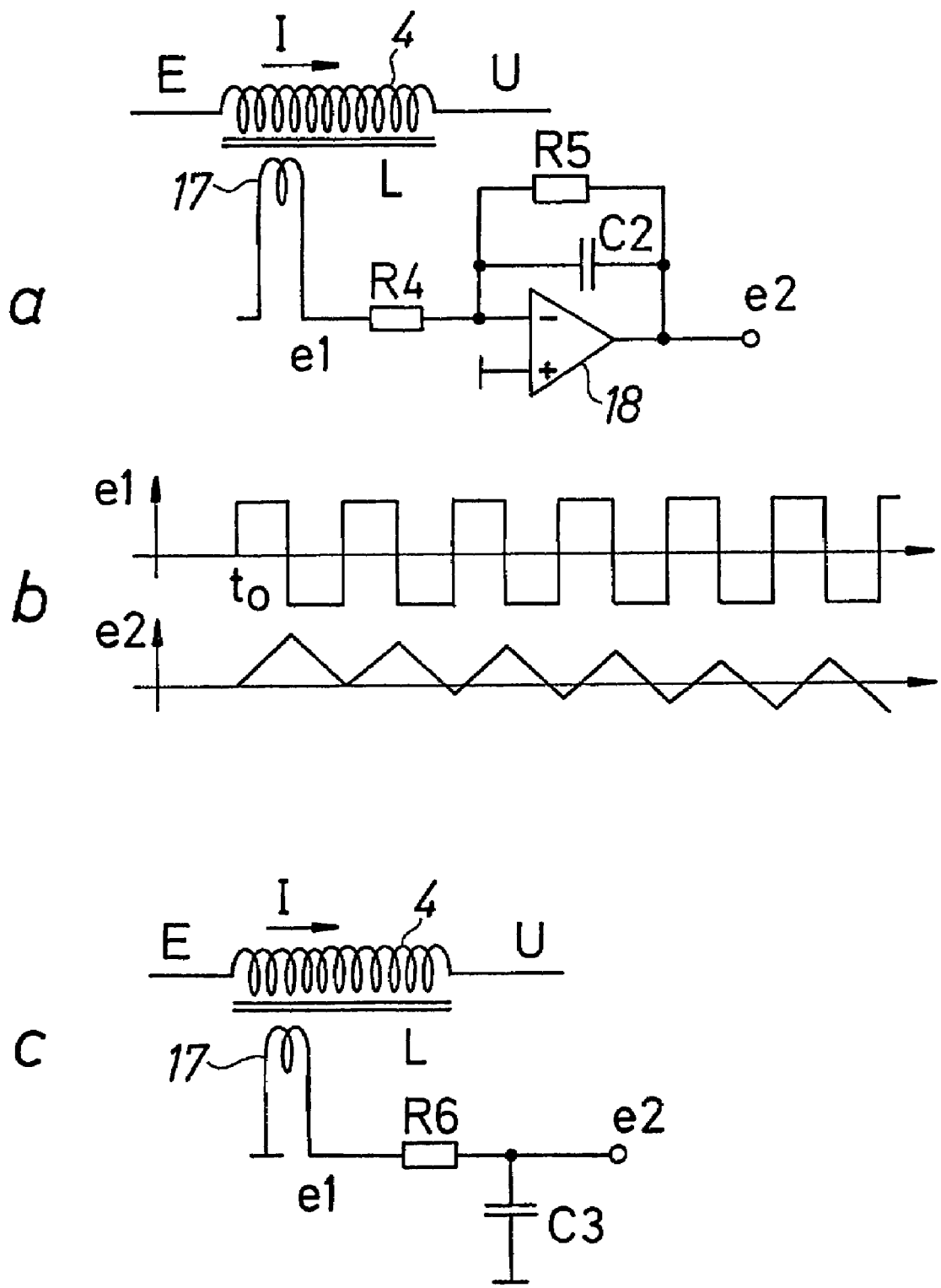
FIG. 4-a shows a modified analog integrator with a feedback resistor.

FIG. 4-a shows a realistic conventional measuring circuit, where a feedback resistor R5 eliminates the integrating action for low frequencies. This eliminates most of the integrator drift that is caused by any DC offset voltage. However, such a modified integrator cannot integrate DC signals. FIG. 4-b shows the same switch sequence as in FIG. 3-b. Now the AC components in the signal are correctly integrated but the DC component disappears with a certain time constant. The time constant is defined by the values of resistor R5 and capacitor C2. The resulting signal is symmetrically centred around the zero level. The peak to peak AC amplitude of the integrated signal in FIG. 4-b is correct, although the DC level is wrong. Thanks to the geometrical properties of a triangular waveform we can be sure that the positive and negative peaks have exactly the same amplitude. Consequently, the peak amplitude of the integrated signal in FIG. 4-b represents exactly half the AC current in the inductor winding.

Every new switch cycle starts from zero current. Thanks to this, it is not necessary to measure the DC level of the current. Consequently it is enough to calculate the amplitude of the AC current with a modified integrator as shown in FIG. 4-a.

The transfer function of the circuit in FIG. 4-a is:

$$e2 = -e1 \frac{R5}{R4(1 + sR5C2)}$$

where s=Laplace operator

At low frequencies this circuit has a constant DC-gain=R5/R4.

At high frequencies this circuit acts as a pure integrator with the transfer function:

$$e2 = -e1 \frac{1}{sR4C2}$$

The transition region where the circuit changes from constant DC-gain to a pure integrator is defined by the break frequency:

$$\omega_0 = \frac{1}{R5C2}$$

The break frequency must be lower than the lowest frequency for the switch circuit, e.g. 5 times lower, in order to give a good accuracy for the integrator function.

The present invention provides a simplified measuring circuit that is shown in FIG. 4-c. An RC network with a resistor R6 and a capacitor C3 can give exactly the same type of output signal as the modified integrator in FIG. 4-*a*. This solution is much simpler, costs much less and is more reliable and accurate. The whole current measuring system in FIG. 4-*c* is very stable and absolutely free from any source of offset signals. Also, it has no frequency limitations on the high frequency side.

The transfer function of the circuit in FIG. 4-*c* is:

$$e2 = e1 \frac{1}{1 + sR6C3}$$

At low frequencies this circuit has a constant DC-gain=1.

At high frequencies this circuit acts as a pure integrator with the transfer function:

$$e2 = e1 \frac{1}{sR6C3}$$

The break frequency for this circuit is:

$$\omega_0 = \frac{1}{R6C3}$$

It is clear that the two transfer functions can be given the same break frequency, by help of suitable component values. Then there are some differences. The circuit in FIG. 4-*a* inverts the signal and the circuit in FIG. 4-*c* does not. The integrator gain in the two circuits is also different. These two differences are, however, easily compensated for in the practical design of the switch circuit. It should be noted that the first circuit has an upper frequency limit, not shown in the equations, which depends on the operational amplifier 18. There is no such upper frequency limit in the second circuit.

Component values can be given as a practical example:
R6=10 kiloohm and C3=15 nanofarad gives:
$\omega_0$=6667 radians/second $$f_0 = \frac{\omega_0}{2\pi} = 1061 \text{ Herz}$$

These are suitable values if the lowest switch frequency is approximately 5 kHz.

A device with the same function may also be implemented by means of software, e.g. with a digital signal processor (not shown). The signal e1 is sampled with a suitable accuracy and with sufficiently high sampling frequency, at least 10 times higher than the expected highest switch frequency. The RC network is emulated by programming the digital signal processor such that the output e2 approximates the analog integrator shown in FIG. 4-*c*.

Figure 5:
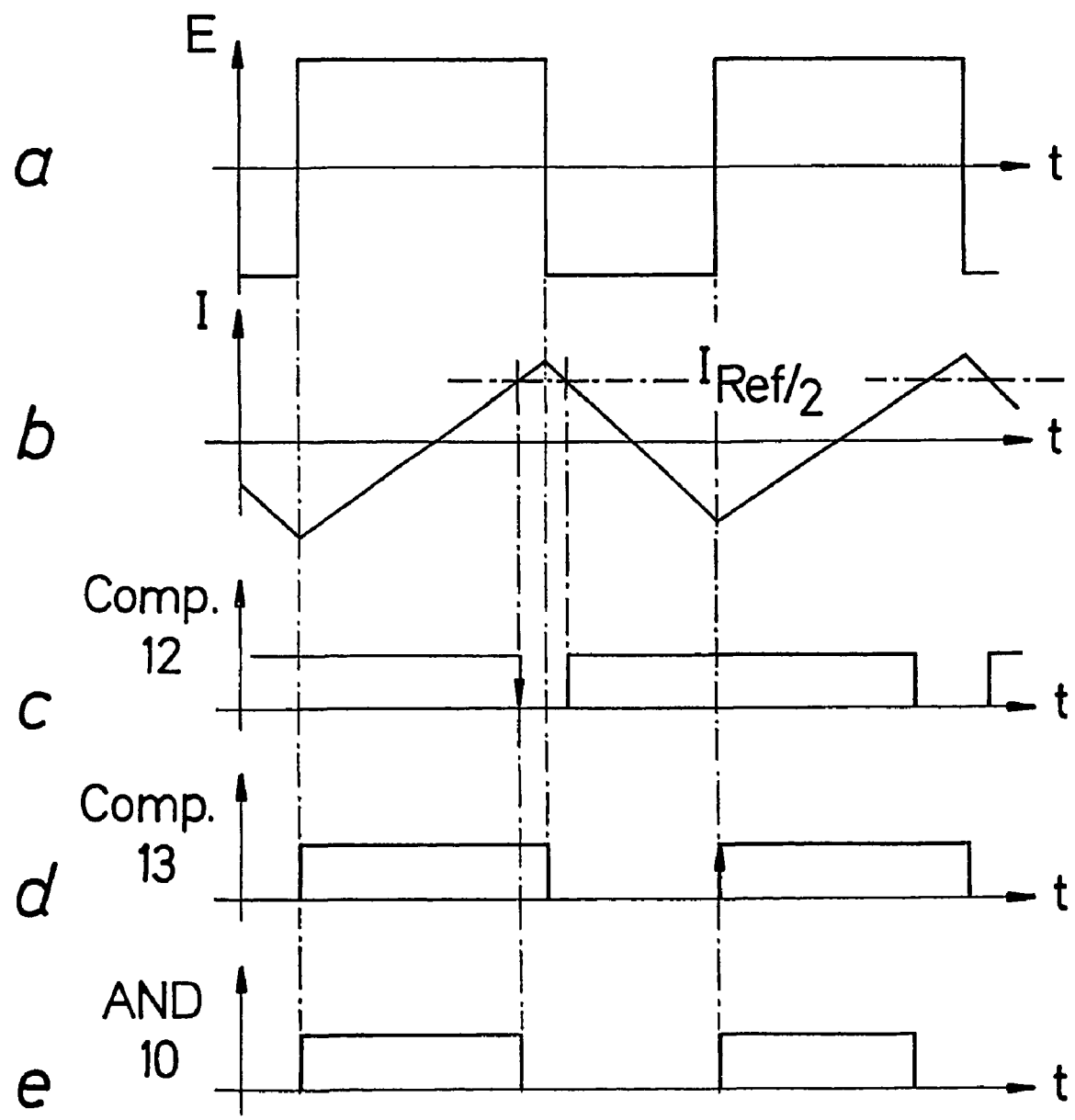
FIG. 5 shows a time diagram of signals appearing in the circuit of FIG. 1 with an integrator according to the present invention for positive inductor current.
Figure 6:
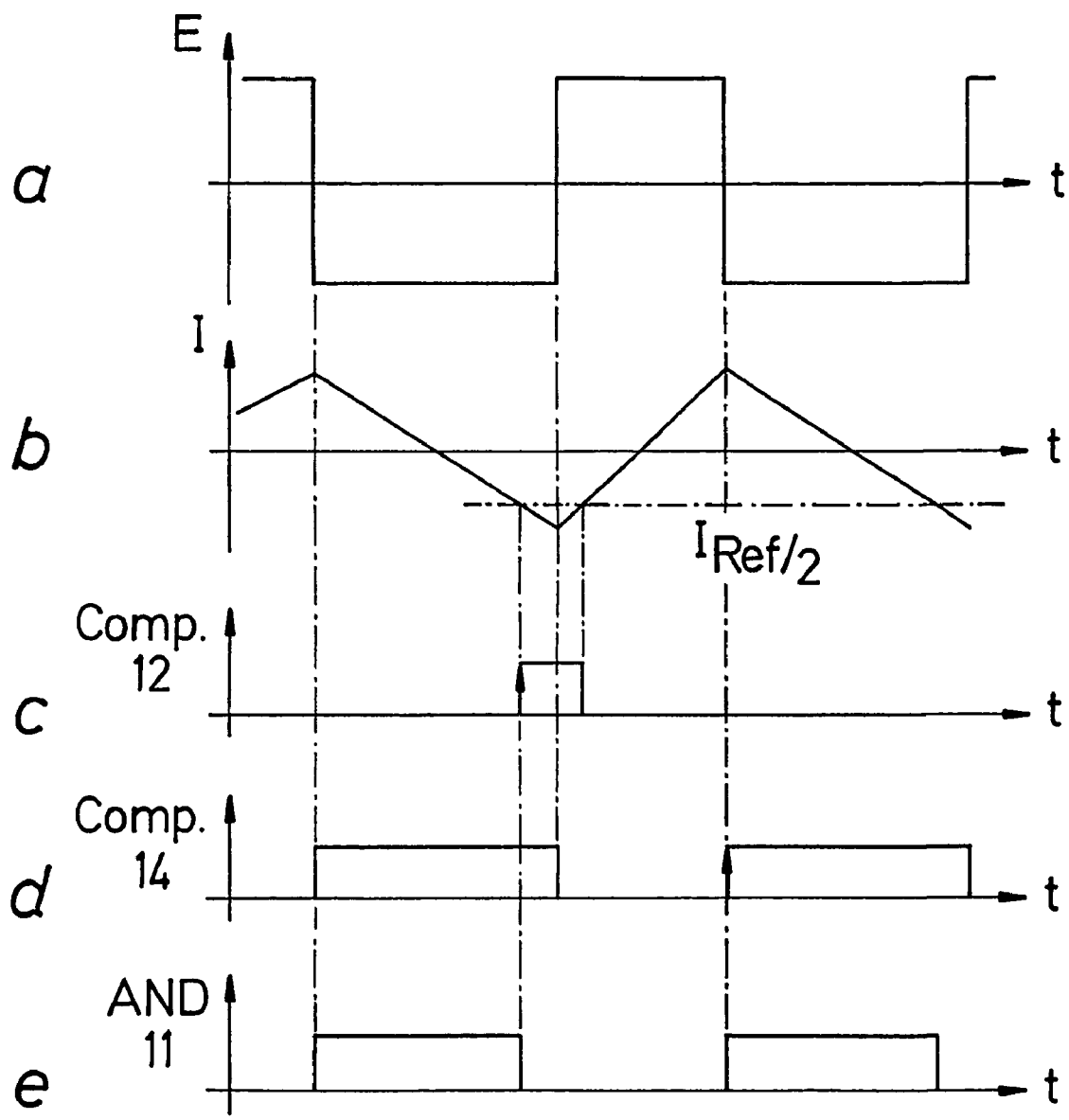
FIG. 6 shows a time diagram similar to FIG. 5 with negative inductor current.
Figure 7:
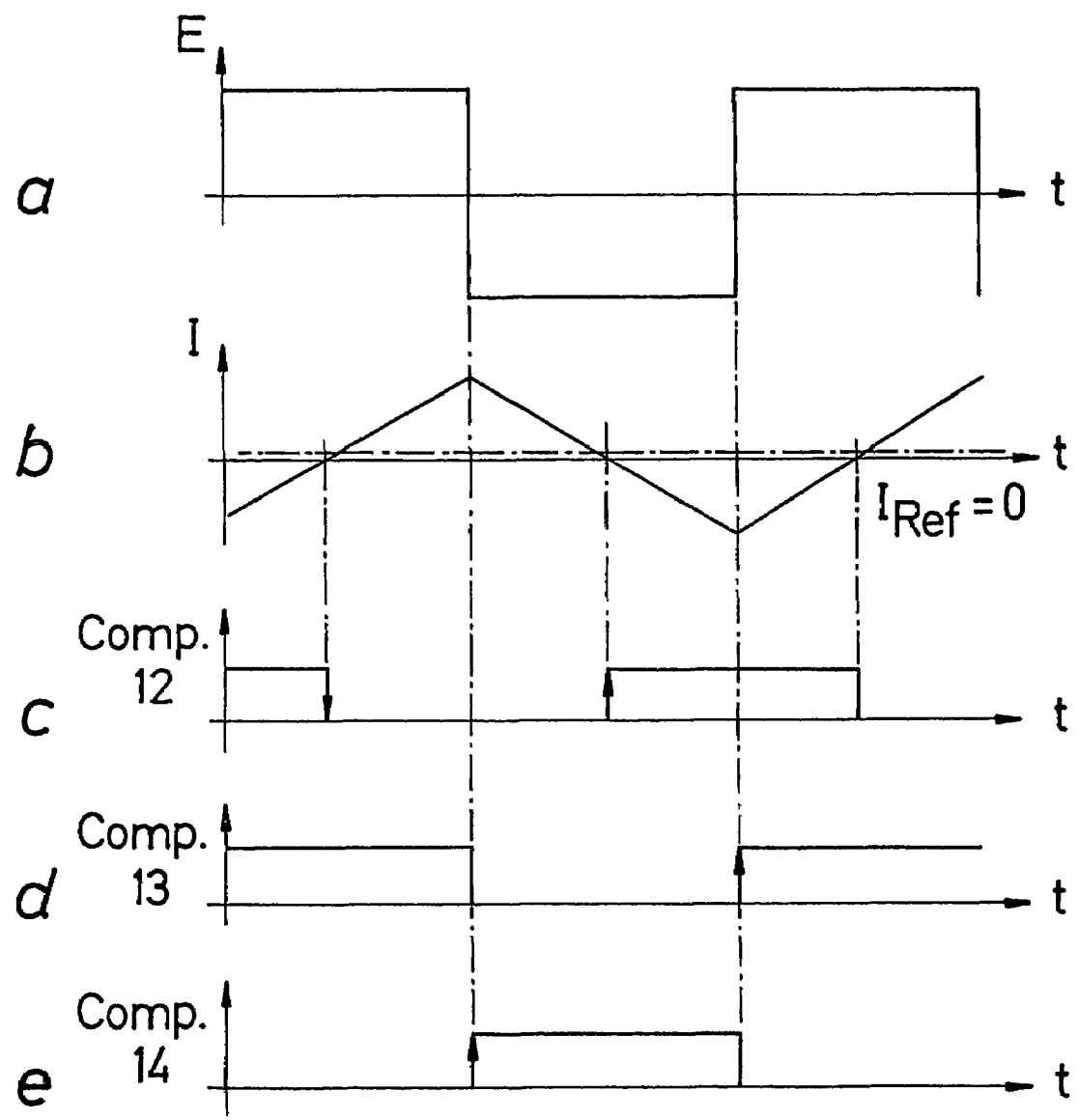
FIG. 7 shows a time diagram similar to FIG. 5 with zero inductor current.

Although the current measuring system in FIG. 4-*c* doesn't give any information about the current direction, the special switch sequence will automatically react correctly on the rising and falling edges of the current and voltage comparator signals. FIGS. 5–7 show three different cases, with positive current, negative current and zero current.

FIG. 5 shows a case with positive inductor current. Curve a shows the bridge voltage E. Curve b shows the calculated inductor current I according to the measurement circuit in FIG. 4-*c* together with a reference current Iref/2, which defines half the desired peak current in the inductor. The division by 2 compensates for the missing DC level in the calculated inductor current. Curve c shows the output signal from current comparator 12. Curve d shows the output signal from voltage comparator 13. The falling edge from the current comparator 12 turns off the upper switch transistor and the rising edge from the voltage comparator 13 turns it on. The two active edges are indicated with up and down arrows.

FIG. 6 shows an identical case, however with negative inductor current. Curve a and b show similar signals as in FIG. 5. Note that also IRef/2 is negative. Curve c shows the output signal from voltage comparator 12. Here the rising edge from the current comparator turns off the lower switch transistor and the rising edge from the voltage comparator turns it on. The two active edges are indicated with two up arrows.

Thus, it is seen that the current comparator 12 as well as the voltage comparators 13, 14 react correctly even though the measuring circuit does not distinguish between the two different current directions.

The diagrams in FIGS. 2, 5, 6 and 7 show that there is a short time delay from the moment when the current comparator reacts until the bridge voltage changes. This delay is mainly caused by the drive circuit for the switch transistor. It takes some time to turn off the transistor.

FIG. 7 shows a case where the value of Iref/2 is zero. However, the inductor current will not be exactly zero. The delay time helps to create an oscillating system where both the upper and the lower switch transistors turn on during every switch cycle. The frequency depends on the delay time and it is possible to change the frequency by means of the delay time. A high frequency gives a low current ripple in the inductor, but also more switching losses in the transistors. An optimal compromise between switching losses and inductor current ripple must be found. Note that FIG. 7 has not the same scaling for time and amplitude as FIGS. 5 and 6.

The switch circuit will automatically change between the three operating modes in FIGS. 5–7 in dependence of the reference current Iref. In the transition region there will be a mix between the operating modes. Iref is often a sine-shaped AC signal with a slow (e.g. 50 Hz) frequency.

Naturally, all possible combinations of power and signal components can be used, also if all combinations are not mentioned here.

The invention claimed is:

1. Means for controlling a power supply circuit for providing electric power to a load (7), comprising:
   a power supply stage having an LC circuit with an inductor (4) and filter capacitors (5) and (6), and
   a control stage for creating a special switch sequence,
      wherein the power supply stage comprises a bridge circuit (1) including two semiconductor members (2, 3) connected in series between positive (+V0) and negative (−V0) power supply rails, each semiconductor member comprising a switchable member for conducting current to or from the load (7) in the forward direction of the semiconductor member under control of a control drive circuit, with a free-wheel diode connected in parallel with the switchable member for conduction of current in the opposite direction;
      wherein the control stage comprises a monitor circuit for monitoring the bridge voltage (E) of the connection between the two semiconductors members (2), (3) and the current (I) through the inductor (4), said monitor circuit comprising
  a first comparator (12) for comparing when the current (I) through the inductor exceeds a reference value (Iref) and
  a second comparator (13, 14) for comparing when the bridge voltage (E) changes polarity towards the corresponding rail polarity;
a drive circuit adapted to provide a firing pulse to one of said switchable members of said semiconductor members for initiating the conduction thereof; said drive circuit being adapted to terminate the conduction of said switchable member when said first comparator (12) determines that the current (I) through the inductor exceeds said reference value (Iref) and to provide another firing pulse when said second comparator (13, 14) determines that the bridge voltage (E) changes polarity towards the corresponding rail polarity, said drive circuit comprising a means for measuring the current (I) through the inductor comprising a measuring winding (17) and an integrator consisting essentially of an analog RC network (R6, C3).

2. A control means in accordance with claim 1, wherein the break frequency of the RC network, (R6, C3) is lower than a lowest frequency utilized in the bridge circuit.

3. A control means in accordance with claim 2, characterized by a resistance (R6) of 10 kΩ, and a capacitance (C3) of 15 nF for a lowest frequency of the bridge circuit being approximately 5 kHz.

4. Method for controlling a power supply circuit for providing electric power to a load (7), comprising:
  a power supply stage having an LC circuit with an inductor (4) and filter capacitors (5) and (6), and
  a control stage for creating a special switch sequence,
wherein the power supply stage comprises a bridge circuit (1) including two semiconductor members (2, 3) connected in series between positive (+V0) and negative (−V0) power supply rails, each semiconductor member comprising a switchable member for conducting current to or from the load (7) in the forward direction of the semiconductor member under control of a control drive circuit, with a free-wheel diode connected in parallel with the switchable member for conduction of current in the opposite direction;
  wherein the control stage comprises a monitor circuit for monitoring the bridge voltage (E) of the connection between the two semiconductors members (2), (3) and the current (I) through the inductor (4), said monitor circuit comprising a first comparator (12) for comparing when the current (I) through the inductor exceeds a reference value (Iref) and a second comparator (13, 14) for comparing when the bridge voltage (E) changes polarity towards the corresponding rail polarity;
a drive circuit adapted to provide a firing pulse to one of said switchable members of said semiconductor members for initiating the conduction thereof; said drive circuit being adapted to terminate the conduction of said switchable member when said first comparator (12) determines that the current (I) through the inductor exceeds said reference value (Iref) and to provide another firing pulse when said second comparator (13, 14) determines that the bridge voltage (E) changes polarity towards the corresponding rail polarity, said drive circuit comprising a means for measuring the current (I) through the inductor comprising a measuring winding (17) and an integrator consisting essentially of an RC network (R6, C3).

5. A method in accordance with claim 4, wherein the break frequency of the RC network, (R6, C3) is lower than a lowest frequency utilized in the bridge circuit.

6. A method in accordance with claim 5, characterized by a resistance (R6) of 10 kΩ, and a capacitance (C3) of 15 nF for a lowest switch frequency of approximately 5 kHz.

* * * * *